United States Patent
Asai

(10) Patent No.: US 11,131,277 B2
(45) Date of Patent: Sep. 28, 2021

(54) INTERNAL COMBUSTION ENGINE

(71) Applicant: Yanmar Co., Ltd., Osaka (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/647,452

(22) PCT Filed: Sep. 10, 2018

(86) PCT No.: PCT/JP2018/033377
§ 371 (c)(1),
(2) Date: Mar. 13, 2020

(87) PCT Pub. No.: WO2019/059015
PCT Pub. Date: Mar. 28, 2019

(65) Prior Publication Data
US 2020/0277906 A1    Sep. 3, 2020

(30) Foreign Application Priority Data

Sep. 21, 2017   (JP) .............................. JP2017-181202

(51) Int. Cl.
*F02M 27/02*    (2006.01)
*F02D 19/06*    (2006.01)
(Continued)

(52) U.S. Cl.
CPC ......... *F02M 27/02* (2013.01); *F02D 19/0663* (2013.01); *F02D 19/081* (2013.01); *F02D 41/0025* (2013.01); *F02M 33/00* (2013.01)

(58) Field of Classification Search
CPC .... F02M 27/02; F02M 33/00; F02D 19/0663; F02D 19/081; F02D 41/0025
See application file for complete search history.

(56) References Cited

U.S. PATENT DOCUMENTS

2004/0250790 A1* 12/2004 Heywood ............... F02B 51/00
                                                                    123/300
2005/0086865 A1*  4/2005 Crane, Jr. ............... C01B 3/342
                                                                    48/198.7
(Continued)

FOREIGN PATENT DOCUMENTS

JP    2002-038981 A    2/2002
JP    2014-136978 A    7/2014
(Continued)

OTHER PUBLICATIONS

International Search Report dated Dec. 4, 2018 issued in corresponding PCT Application PCT/JP2018/033377.

*Primary Examiner* — Kevin A Lathers
(74) *Attorney, Agent, or Firm* — Norton Rose Fulbright US LLP

(57) ABSTRACT

An internal combustion engine including: an operating state detection unit that detects an operating state of the internal combustion engine; a fuel reforming unit configured to be supplied with a liquid fuel including hydrocarbon and generate a reformed fuel having an octane number larger than that of the supplied liquid fuel; a reformed fuel composition adjusting unit that adjusts the composition of the reformed fuel generated by the fuel reforming unit; and a control device that controls the composition of the reformed fuel by controlling the reformed fuel composition adjusting unit in accordance with the operating state detected by the operating state detection unit.

14 Claims, 7 Drawing Sheets

(51) Int. Cl.
*F02D 19/08* (2006.01)
*F02D 41/00* (2006.01)
*F02M 33/00* (2006.01)

(56) References Cited

U.S. PATENT DOCUMENTS

2014/0216029 A1* 8/2014 Gruber .................. F02M 21/06
  60/605.1
2017/0284315 A1* 10/2017 Asai ...................... F02M 33/00

FOREIGN PATENT DOCUMENTS

| | | |
|---|---|---|
| JP | 2016-070131 A | 5/2016 |
| JP | 2016-094930 A | 5/2016 |
| JP | 2016-166611 A | 9/2016 |
| WO | 2018/012308 A | 1/2018 |
| WO | 2018/012311 A1 | 1/2018 |

* cited by examiner

INTERNAL COMBUSTION ENGINE

CROSS REFERENCES TO RELATED APPLICATIONS

This application is a national stage application pursuant to 35 U.S.C. § 371 of International Application No. PCT/JP2018/033377, filed on Sep. 10, 2018, which claims priority under 35 U.S.C. § 119 to Japanese Patent Application No. 2017-181202, filed on Sep. 21, 2017, the disclosures of which are hereby incorporated by reference in their entireties.

TECHNICAL FIELD

The present invention relates to an internal combustion engine including a fuel reforming unit for generating, from a liquid fuel including hydrocarbon, a reformed fuel having an octane number larger than that of the liquid fuel.

BACKGROUND ART

There has been known a combustion method in which a reformed fuel reformed with a reforming catalyst and having a low ignitability is premixed with air and this premixed gas is taken into cylinders and a fuel having a high ignitability (such as light oil) is also supplied for ignition (dual fuel combustion) (see, for example, Patent Literature 1: PTL 1). There has also been known an internal combustion engine that includes a reciprocation type fuel reformation cylinder for reforming a liquid fuel to generate a reformed fuel having a low ignitability (having a large octane number) and premix the fuel and that also includes an output cylinder configured to obtain an engine power by sucking an air-fuel mixture including the reformed fuel and burning the mixture (see, for example, Patent Literature 2: PTL 2).

In the internal combustion engine of PTL 2, a liquid fuel including hydrocarbon, such as light oil, gasoline, or heavy oil, is supplied to the fuel reformation cylinder, and an air-fuel mixture having a high equivalence ratio is adiabatically compressed in the fuel reformation cylinder. Accordingly, the liquid fuel is reformed under a high-temperature and high-pressure environment, thereby generating a reformed fuel having a high anti-knock property, such as hydrogen ($H_2$), carbon monoxide (CO), and methane ($CH_4$), that is, a gaseous reformed fuel having a large octane number. This reformed fuel is premixed with air to generate and supply a lean air-fuel premixture to the output cylinder, and combustion (uniform lean combustion of the lean mixture) is performed in the output cylinder supplied with the lean air-fuel premixture, thereby obtaining an engine power.

To achieve excellent uniform lean combustion of the lean mixture in the output cylinder, a lean air-fuel premixture including a reformed fuel is sucked into the output cylinder, and then, a fuel (e.g., light oil) having a higher ignitability than a reformed fuel is injected as a pilot fuel reformed fuel at an ignition timing near a compression top dead point. Accordingly, excellent ignition of a lean air-fuel premixture with a reformed fuel having a low ignitability can be obtained so that combustion can be performed at an optimum timing.

In the dual fuel combustion described above, since uniform lean combustion of the lean mixture is performed in the output cylinder, NOx emission can be reduced, and soot can also be reduced. In addition, since a reformed fuel having a high anti-knock property is burnt as a fuel, knocking can be suppressed. Furthermore, combustion can be performed at an optimum timing by injecting a fuel for ignition at a predetermined timing so that a combustion efficiency can be enhanced.

CITATION LIST

Patent Literatures

PTL 1: Japanese Patent Application Laid-Open No. 2016-070131
PTL 2: Japanese Patent Application Laid-Open No. 2014-136978

SUMMARY OF INVENTION

Technical Problem

As described above, in a case where a lean air-fuel premixture including a reformed fuel is supplied to an output cylinder and an ignition fuel is injected for ignition, the following problems are found.

In an operating state where an internal combustion engine has a low load, an equivalence ratio in an output cylinder is set low. In a case where the equivalence ratio is low, the air-fuel mixture is excessively lean. Thus, even when a fuel having a high ignitability is injected near a compression top dead point, flame does not propagate well, and accidental fire is more likely to occur. Even if accidental fire does not occur, a decrease in the combustion gas temperature due to leaning increases an unburnt hydrocarbon (HC), thus deteriorating a thermal efficiency. In addition, methane ($CH_4$) occupying a large proportion of a reformed fuel has a global warming potential significantly larger than that of carbon dioxide, which might adversely affect environments.

Furthermore, in an operating state where the internal combustion engine has a high load, a reformed fuel is further required to have a high anti-knock property, and thus, it is required that a larger amount of a component having a high anti-knock property, such as hydrogen, carbon monoxide, or methane, is included in a reformed fuel. However, each of hydrogen and carbon monoxide has a smaller calorific value per a mole than, for example, methane, and thus, when the internal combustion engine is in a high load state, a desired power might not be obtained.

Moreover, if a large amount of hydrogen is supplied to the output cylinder in a situation where the internal combustion engine is in the high load state, hydrogen having a low flash point causes preignition in the output cylinder having an increased temperature or knocking occurs in the output cylinder.

The present invention has been made in view of the foregoing circumstances, and some aspects of the present invention have a main technical object of providing an internal combustion engine enabling normal combustion of a lean air-fuel mixture generated from a reformed fuel to be performed in a wide operation range.

Solution to Problem

To achieve the main technical object, an aspect of the present invention provides internal combustion engine including: an operating state detection unit that detects an operating state of the internal combustion engine; a fuel reforming unit to which a liquid fuel including hydrocarbon is supplied, the fuel reforming unit being configured to generate a reformed fuel having an octane number larger than that of the liquid fuel supplied to the fuel reforming unit; a reformed fuel composition adjusting unit that adjusts a composition of the reformed fuel generated by the fuel reforming unit; and a control device that controls the reformed fuel composition adjusting unit in accordance with the operating state detected by the operating state detection unit and adjusts the composition of the reformed fuel.

The control device preferably controls the reformed fuel composition adjusting unit such that a proportion of hydrogen included in the reformed fuel when the internal combustion engine has a low load is larger than a proportion of hydrogen included in the reformed fuel when the internal combustion engine has a high load. The control device preferably controls the reformed fuel composition adjusting unit such that a proportion of carbon monoxide included in the reformed fuel when the internal combustion engine has a low load is larger than a proportion of carbon monoxide included in the reformed fuel when the internal combustion engine has a high load. In addition, the control device preferably controls the reformed fuel composition adjusting unit such that a proportion of methane included in the reformed fuel when the internal combustion engine has a high load is larger than a proportion of methane included in the reformed fuel when the internal combustion engine has a low load.

The control device preferably may include a required power calculation unit that calculates a required power to be output from the internal combustion engine based on the operating state detected by the operating state detection unit, and the control device may calculate a target heat generation quantity of the reformed fuel from the required power and a reformation efficiency in the fuel reforming unit and, based on the target heat generation quantity, may determine a composition of a reformed fuel as a target.

The control device may control the reformed fuel composition adjusting unit such that an equivalence ratio of an air-fuel mixture introduced into the fuel reforming unit when the internal combustion engine has a high load is higher than an equivalence ratio of an air-fuel mixture introduced into the fuel reforming unit when the internal combustion engine has a low load.

The control device may control the reformed fuel composition adjusting unit such that a temperature of an intake gas introduced into the fuel reforming unit when the internal combustion engine has a high load is higher than a temperature of an intake gas introduced into the fuel reforming unit when the internal combustion engine has a low load.

The fuel reforming unit may be constituted by a reciprocation-type mechanism including a reformation cylinder in which a piston reciprocates in a cylinder, and the reformed fuel composition adjusting unit may adjust at least one of an effective compression ratio, an intake gas temperature, an equivalence ratio, and a rotation speed in the reformation cylinder.

The control device may control the reformed fuel composition adjusting unit such that an effective compression ratio of the reformation cylinder when the internal combustion engine has a high load is higher than an effective compression ratio of the reformation cylinder when the internal combustion engine has a low load.

Advantageous Effects of Invention

An aspect of the present invention provides an internal combustion engine including: an operating state detection unit that detects an operating state of the internal combustion engine; a fuel reforming unit to which a liquid fuel including hydrocarbon is supplied, the fuel reforming unit being configured to generate a reformed fuel having an octane number larger than that of the liquid fuel supplied to the fuel reforming unit; a reformed fuel composition adjusting unit that adjusts a composition of the reformed fuel generated by the fuel reforming unit; and a control device that controls the reformed fuel composition adjusting unit in accordance with the operating state detected by the operating state detection unit and adjusts the composition of the reformed fuel. This configuration can provide an internal combustion engine enabling normal combustion of a lean air-fuel mixture generated from a reformed fuel to be performed in a wide operating range.

DESCRIPTION OF EMBODIMENTS

An internal combustion engine according to an embodiment configured based on an aspect of the present invention will be described in detail hereinafter with reference to the accompanying drawings.

Figure 1:
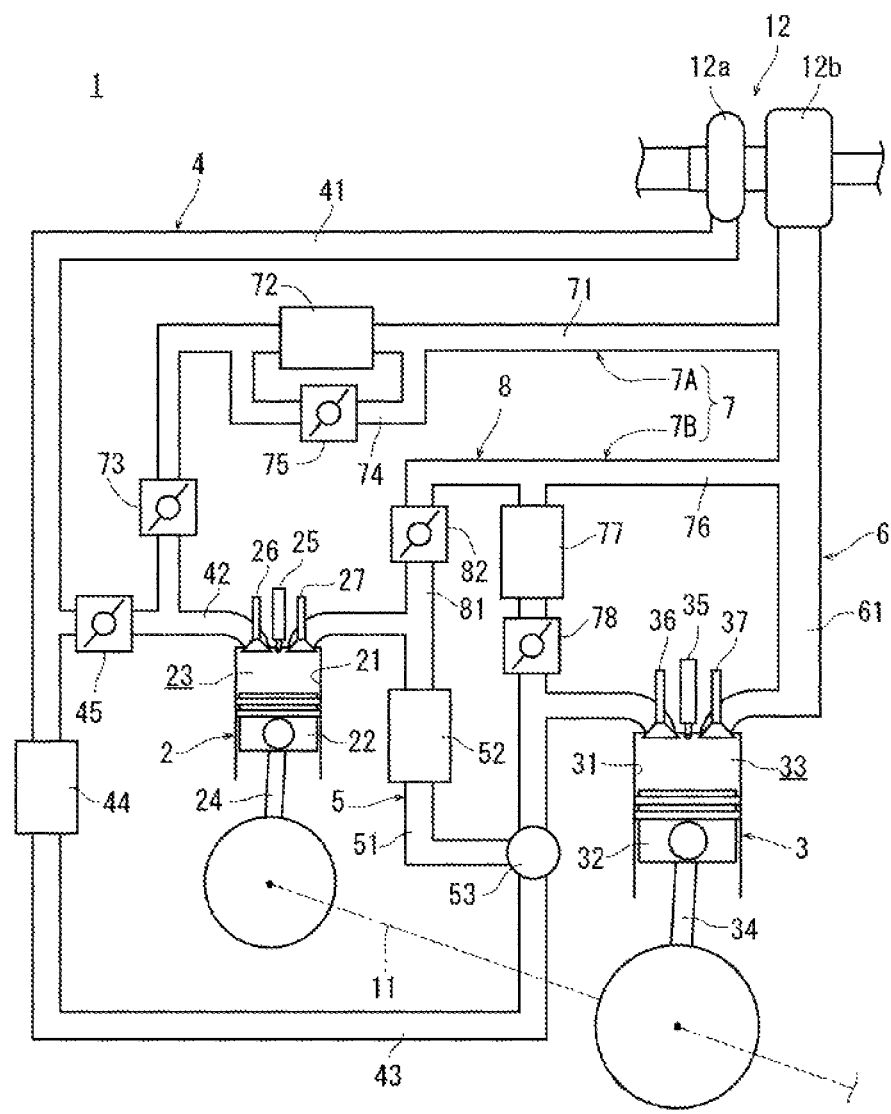
FIG. 1 A view illustrating a system configuration of an internal combustion engine according to an embodiment configured based on an aspect of the present invention.

FIG. 1 schematically illustrates a system configuration of an internal combustion engine 1 according to this embodiment. The internal combustion engine 1 is applied to, for example, a stationary type electric generator, and includes a fuel reformation cylinder 2 for constituting a fuel reforming unit and an output cylinder 3. In this internal combustion engine 1, a pipe system is constituted by an intake system 4, a reformed fuel supply system 5, an exhaust system 6, an EGR system 7, and an output cylinder bypass system 8 with respect to the fuel reformation cylinder 2 and the output cylinder 3.

Each of the fuel reformation cylinder 2 and the output cylinder 3 is of a reciprocation type. More specifically, the fuel reformation cylinder 2 and the output cylinder 3 are configured such that pistons 22 and 32 are respectively housed in cylinder bores 21 and 31 formed in unillustrated cylinder blocks to reciprocate freely. In the fuel reformation cylinder 2, a fuel reformation chamber 23 is formed by the cylinder bore 21, the piston 22, and an unillustrated cylinder head. In the output cylinder 3, a combustion chamber 33 is defined by the cylinder bore 31, the piston 32, and an unillustrated cylinder head.

The internal combustion engine 1 of this embodiment includes four cylinders in a cylinder block, and one of the cylinders is structured as the fuel reformation cylinder 2, whereas three other cylinders are structured as the output cylinders 3. Reformed fuel generated by the fuel reformation cylinder 2 is supplied to each output cylinder 3. The number of the fuel reformation cylinder 2 and the number of the output cylinders 3 are not limited to the above example. In a case where the cylinder block includes six cylinders, two of the six cylinders may be fuel reformation cylinders 2 with four other cylinders being output cylinders 3. The number of fuel reformation cylinders 2 is preferably smaller than the number of output cylinders 3.

The piston 22 of the fuel reformation cylinder 2 and the piston 32 of the output cylinder 3 are coupled to a crankshaft 11 indicated by a chain line in the drawing through connecting rods 24 and 34. The crankshaft 11 is coupled to an unillustrated electric generator through an unillustrated clutch mechanism, for example.

The fuel reformation cylinder 2 includes an injector 25 configured to supply a pre-reformed fuel, such as light oil, to the fuel reformation chamber 23. In the fuel reformation chamber 23, the fuel supplied from the injector 25 is compressed by the piston 22 to be thereby adiabatically compressed in a high-temperature and high-pressure environment. Accordingly, the fuel is reformed, thereby generating a reformed fuel having a high anti-knock property and including, for example, hydrogen, carbon monoxide, and methane. The fuel supplied to the fuel reformation chamber 23 may be another liquid fuel including at least hydrocarbon (e.g., gasoline or heavy oil). The fuel reformation cylinder 2 serves as a fuel reforming unit. In this embodiment, the fuel reforming unit is the fuel reformation cylinder 2, as an example, but the internal combustion engine 1 does not always need to include the fuel reformation cylinder 2. As a configuration for reforming a fuel, a reformer for reforming a liquid fuel to a fuel having a high anti-knock property by using a catalytic reaction is widely known, and the fuel reformation cylinder 2 may be replaced by a fuel reforming catalyst as a fuel reforming unit.

As described above, the output cylinder 3 includes the combustion chamber 33, and the injector 35 for supplying an ignition fuel (e.g., light oil) is disposed in the combustion chamber 33. To the combustion chamber 33, a reformed fuel generated in the fuel reformation cylinder 2 is supplied together with air, and forms a uniform air-fuel premixture, and the mixture is compressed by the piston 32. A small amount of ignition fuel is injected from the injector 35 near the compression top dead point so that propagation flame combustion using the ignition fuel as an ignition source is performed. In this manner, reciprocation of the piston 32 is converted to rotation motion of the crankshaft 11, thereby obtaining an engine power.

The intake system 4 introduces air (outdoor air) to the fuel reformation chamber 23 of the fuel reformation cylinder 2 and the combustion chamber 33 of the output cylinder 3. The intake system 4 includes a main intake passage 41, a fuel reformation cylinder intake passage 42 branched from the main intake passage 41 and configured to introduce air to the fuel reformation cylinder 2, and an output cylinder intake passage 43 configured to introduce air from the main intake passage 41 to the output cylinder 3. The main intake passage 41 includes a compressor wheel 12a of a turbocharger 12. The fuel reformation cylinder intake passage 42 is connected to an intake port of the fuel reformation cylinder 2. Between this intake port and the fuel reformation chamber 23 of the fuel reformation cylinder 2, an intake valve 26 that can be opened and closed is disposed. Further, the fuel reformation cylinder intake passage 42 branched from the main intake passage 41 includes an intake-air amount adjusting valve 45 whose opening degree is adjustable. The intake passage 43 of the output cylinder 3 is connected to an intake port of the output cylinder 3. Between this intake port and the combustion chamber 33 of the output cylinder 3, an intake valve 36 that can be opened and closed is disposed. The output cylinder intake passage 43 includes an intake-air cooler (inter cooler) 44.

The reformed fuel supply system 5 supplies a reformed fuel generated in the fuel reformation cylinder 2 to the combustion chamber 33 of the output cylinder 3.

The reformed fuel supply system 5 includes a reformed fuel supply passage 51. The reformed fuel supply passage 51 includes a reformed fuel cooler 52. An upstream end of the reformed fuel supply passage 51 is connected to an exhaust port of the fuel reformation cylinder 2. A downstream end of the reformed fuel supply passage 51 is connected to the output cylinder intake passage 43. A portion in which the reformed fuel supply passage 51 and the output cylinder intake passage 43 are connected to each other is provided with a mixer 53. Thus, the reformed fuel generated by the fuel reformation cylinder 2 is mixed with air flowing in the output cylinder intake passage 43 in the mixer 53, and the mixture is supplied to the combustion chamber 33 of the output cylinder 3.

The exhaust system 6 is configured to discharge an exhaust gas generated by combustion of fuel in the output cylinder 3 to the outside of the internal combustion engine 1. The exhaust system 6 includes an exhaust passage 61. The exhaust passage 61 includes a turbine 12b of the turbocharger 12. The exhaust passage 61 is connected to an exhaust port of the output cylinder 3. Between this exhaust port and the combustion chamber 33 of the output cylinder 3, an exhaust valve 37 is disposed.

The EGR system 7 includes a fuel reformation cylinder EGR system 7A and an output cylinder EGR system 7B.

The fuel reformation cylinder EGR system 7A is configured to supply a part of an exhaust gas flowing in the exhaust passage 61 to the fuel reformation chamber 23 of the fuel reformation cylinder 2. The fuel reformation cylinder EGR system 7A includes a fuel reformation cylinder EGR passage 71. An upstream end of the fuel reformation cylinder EGR passage 71 is connected to the exhaust passage 61. A downstream end of the fuel reformation cylinder EGR passage 71 is connected to a downstream side of the intake-air amount adjusting valve 45 disposed in the fuel reformation cylinder intake passage 42. The fuel reformation cylinder EGR passage 71 includes an EGR gas cooler 72. An EGR gas amount adjusting valve 73 is disposed in a portion of the fuel reformation cylinder EGR passage 71 downstream of the EGR gas cooler 72 (in a position closer to the fuel reformation cylinder intake passage 42). The fuel reformation cylinder EGR passage 71 also includes a cooler bypass passage 74 for allowing an EGR gas to bypass the EGR gas cooler 72. The cooler bypass passage 74 includes a bypass amount adjusting valve 75 for adjusting a bypass amount.

The output cylinder EGR system 7B includes an output cylinder EGR passage 76 for returning a part of an exhaust gas flowing in the exhaust passage 61 to the combustion chamber 33 of the output cylinder 3. An upstream end of the output cylinder EGR passage 76 is connected to the exhaust passage 61. A downstream end of the output cylinder EGR passage 76 is connected to a downstream side of the mixer 53 disposed in the output cylinder intake passage 43. The output cylinder EGR passage 76 includes an EGR gas cooler 77. An EGR gas amount adjusting valve 78 is disposed in a portion of the output cylinder EGR passage 76 downstream of the EGR gas cooler 77 (a portion closer to the output cylinder 3).

The output cylinder bypass system 8 is configured to introduce an exhaust gas from the fuel reformation cylinder 2 into the exhaust passage 61 without supplying the gas to the output cylinder 3. The output cylinder bypass system 8 includes an output cylinder bypass passage 81. An upstream end of the output cylinder bypass passage 81 is connected to an upstream side of the reformed fuel cooler 52 disposed in the reformed fuel supply passage 51. A downstream end of the output cylinder bypass passage 81 is connected to a portion of the output cylinder EGR passage 76 upstream of the EGR gas cooler 77 (a portion closer to the exhaust passage 61). The output cylinder EGR passage 81 includes a bypass amount adjusting valve 82.

The intake-air cooler 44, the reformed fuel cooler 52, and the EGR gas coolers 72 and 77 of this embodiment described above are cooled by cooling water of the internal combustion engine 1. The intake-air cooler 44, the reformed fuel cooler 52, and the EGR gas coolers 72 and 77 are not limited to being cooled with the cooling water of the internal combustion engine 1, and may be cooled using an air-cooling source or another heat sink.

Figure 2:
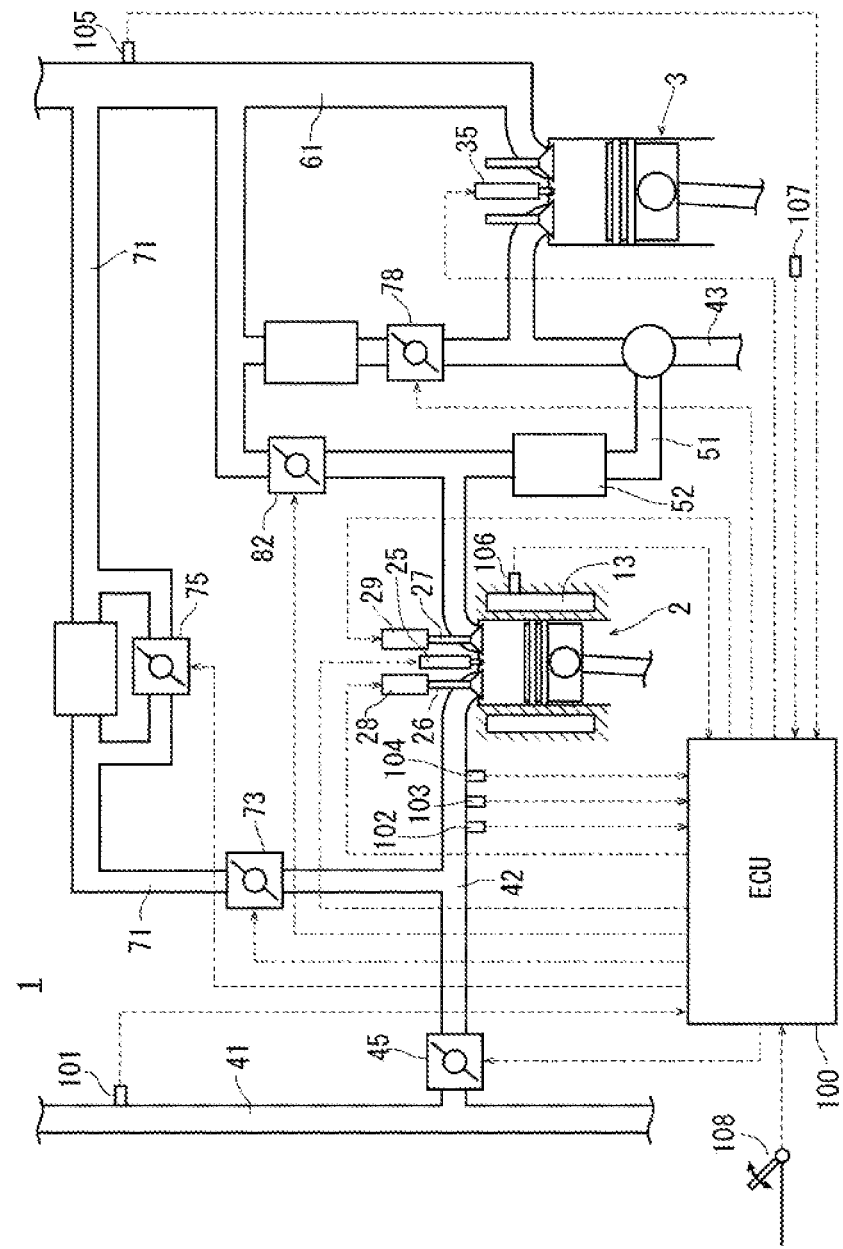
FIG. 2 A view illustrating a schematic configuration of a control system of the internal combustion engine illustrated in FIG. 1.

The control system of the internal combustion engine 1 whose configuration has been described based on FIG. 1 will be described with reference to FIG. 2. FIG. 2 is a diagram illustrating a schematic configuration of the control system of the internal combustion engine 1. The internal combustion engine 1 includes an ECU (electronic control unit) 100 corresponding to a control device for controlling various actuators included in the internal combustion engine 1. The ECU 100 is constituted by a computer, and includes a central processing unit (CPU) for performing a computation process in accordance with a control program, a read only memory (ROM) for storing the control program, various control maps, and so forth, a readable/writable random-access memory (RAM) for temporarily storing a detected value, a computation result, and so forth, an input interface, and an output face, for example, (details of which are not shown).

As illustrated in FIG. 2, the internal combustion engine 1 includes an intake-air flow rate sensor 101, an intake-gas pressure sensor 102, an intake-gas temperature sensor 103, an intake-gas $O_2$ sensor 104, an exhaust-gas pressure sensor 105, a water temperature sensor 106, a rotation speed sensor 107, and an accelerator lever opening degree sensor 108, for example. The sensors 101 through 108 are electrically connected to the ECU 100. Each of the sensors 101 through 108 functions as an operating state detection unit for detecting an operating state of the internal combustion engine 1.

The intake-air flow sensor 101 transmits, to the ECU 100, an output signal corresponding to the flow rate of intake air flowing in the main intake passage 41.

The intake-gas pressure sensor 102 transmits to the ECU 100, an output signal corresponding to the pressure of the intake gas flowing in the fuel reformation cylinder intake passage 42. Specifically, the intake-gas pressure sensor 102 transmits, to the ECU 100, an output signal corresponding to the pressure of an intake gas in a portion downstream of a portion of the fuel reformation cylinder EGR passage 71 connected to the fuel reformation cylinder intake passage 42.

The intake-gas temperature sensor 103 transmits, to the ECU 100, an output signal corresponding to the temperature of the intake gas flowing in the fuel reformation cylinder intake passage 42. Specifically, the intake-gas temperature sensor 103 transmits, to the ECU 100, an output signal corresponding to the temperature of an intake gas in a portion downstream of a portion of the fuel reformation cylinder EGR passage 71 connected to the fuel reformation cylinder intake passage 42.

The intake-gas O2 sensor 104 transmits, to the ECU 100, an output signal corresponding to an oxygen concentration in the intake gas flowing in the fuel reformation cylinder intake passage 42. Specifically, the intake-gas O2 sensor 104 transmits, to the ECU 100, an output signal corresponding to the oxygen concentration in the intake gas in the portion downstream of the portion of the fuel reformation cylinder EGR passage 71 connected to the fuel reformation cylinder intake passage 42.

The exhaust-gas pressure sensor 105 transmits, to the ECU 100, an output signal corresponding to the pressure of an exhaust gas flowing in the exhaust passage 61. Specifically, the exhaust-gas pressure sensor 105 transmits, to the ECU 100, an output signal corresponding to pressure of an exhaust gas upstream of the portion of the fuel reformation cylinder EGR passage 71 connected to the exhaust passage 61.

The water temperature sensor 106 transmits, to the ECU 100, an output signal corresponding to the temperature of cooling water flowing in a cooling water passage 13 formed in the cylinder block. Specifically, the water temperature sensor 106 transmits, to the ECU 100, an output signal corresponding to the temperature of the cooling water flowing in the cooling water passage 13 formed around the fuel reformation cylinder 2.

The rotation speed sensor 107 is configured to detect an engine speed of the internal combustion engine 1, and transmits an output signal to the ECU 100. Specifically, the rotation speed sensor 107 is disposed to detect a rotation speed of a camshaft of an unillustrated fuel pump driven by the crankshaft 11, and transmits, to the ECU 100, a rotation speed signal of the fuel pump proportional to the rotation speed of the crankshaft 11.

The accelerator lever opening degree sensor 108 is configured to detect a required load factor required for the internal combustion engine 1, and transmits an output signal to the ECU 100. Specifically, the accelerator lever opening degree sensor 108 detects an opening degree of an accelerator lever driven based on a load signal that varies depending on an operation state of the electric generator connected to the internal combustion engine 1, and transmits an opening degree signal of the accelerator lever as a required load factor to the ECU 100.

As well as the sensors described above, the injectors 25 and 35, the adjusting valves 45, 73, 75, 78, and 82, and other components are electrically connected to the ECU 100. The intake valve 26 and the exhaust valve 27 of the fuel reformation cylinder 2 include the variable valve units 28 and 29, respectively. The variable valve units 28 and 29 are configured to freely change opening/closing timings of the intake valve 26 and the exhaust valve 27, respectively. The ECU 100 is also electrically connected to the variable valve units 28 and 29. Based on output signals of the sensors 101 through 108, the ECU 100 performs fuel injection control of adjusting an injection start time and end time of the injectors 25 and 35, opening/closing control of, for example, the adjusting valves 45, 73, 75, 78, and 82, and opening/closing timing control of the intake valve 26 and the exhaust valve 27 by the variable valve units 28 and 29.

A basic operation of the internal combustion engine 1 will now be described with reference to FIGS. 1 and 2.

The air introduced into the main intake passage 41 is pressurized by the compressor wheel 12a of the turbocharger 12. The air is then branched into the fuel reformation cylinder intake passage 42 and the output cylinder intake passage 43. At this time, the flow rate of the intake air flowing in the fuel reformation cylinder intake passage 42 is adjusted by the intake-air amount adjusting valve 45. Further, the EGR gas that has flowed through the fuel reformation cylinder EGR system 7A is introduced into the fuel reformation cylinder intake passage 42. At this time, the amount of the EGR gas introduced into the fuel reformation cylinder intake passage 42 is adjusted by the EGR gas amount adjusting valve 73. Further, the temperature of the EGR gas introduced into the fuel reformation cylinder intake passage 42 is adjusted by using the amount of the EGR gas bypassing the EGR gas cooler 72 in accordance with the opening degree of the bypass amount adjusting valve 75. In this manner, air and the EGR gas are introduced into the fuel reformation chamber 23 of the fuel reformation cylinder 2. At this time, the flow rate of intake air adjusted using the opening degree of the intake-air amount adjusting valve 45, the flow rate of the EGR gas adjusted using the opening degree of the EGR gas amount adjusting valve 73, and the temperature of the EGR gas adjusted using the opening degree of the bypass amount adjusting valve 75 are adjusted to obtain a gas temperature at which reformation of fuel in the fuel reformation chamber 23 can be favorably performed while adjusting the equivalence ratio in the fuel reformation chamber 23. Specifically, the opening degrees of the intake-air amount adjusting valve 45, the EGR gas amount adjusting valve 73, and the bypass amount adjusting valve 75 are controlled such that the equivalence ratio in the fuel reformation chamber 23 at the time of supplying fuel from the injector 25 to the fuel reformation chamber 23 is a predetermined value (e.g., 2.5 or more, and preferably 4.0 or more) and the gas temperature in the fuel reformation chamber 23 is greater than or equal to a lower limit of a reforming reaction allowable temperature. This control can be performed based on an opening degree setting map created in advance through, for example, an experiment or a simulation. Control of the EGR gas amount adjusting valve 73 and the bypass amount adjusting valve 75 will be described in detail later.

As described above, fuel is supplied from the injector 25 to the fuel reformation chamber 23 in a state where air and the EGR gas are introduced into the fuel reformation chamber 23 of the fuel reformation cylinder 2. The fuel supply amount from the injector 25 is set in accordance with a required power of the engine calculated from outputs of the rotation speed sensor 107 of the internal combustion engine 1 (engine speed) and the accelerator lever opening degree sensor 108 (required load factor). Specifically, the valve opening period of the injector 25 is set so as to achieve a target fuel supply amount in accordance with the pressure of fuel supplied to the injector 25. The valve opening period of the injector 25 in this case is set such that injection in accordance with the target fuel supply amount is completed by the time when the intake stroke of the fuel reformation cylinder 2 is finished. The valve opening period of the injector 25 is not limited to this example, and only needs to be a period in which a uniform air-fuel mixture is generated in the fuel reformation chamber 23 before the piston 22 reaches the compression top dead point. The injector 25 is not limited to a type that supplies fuel directly to the fuel reformation chamber 23, and may be disposed between the intake-gas $O_2$ sensor 104 of the fuel reformation cylinder intake passage 42 and the intake valve 26, for example.

While the piston 22 moves toward the compression top dead point, the pressure and the temperature of the fuel reformation chamber 23 increase. In the fuel reformation chamber 23, the air-fuel mixture described above is adiabatically compressed. As a result, reactions such as a dehydrogenation reaction, a partial oxidation reaction, a steam reforming reaction, and a thermal dissociation reaction of fuel take place under a high-temperature and high-pressure environment, thus reforming the fuel to generate a reformed fuel having a high anti-knock property and including, for example, hydrogen, carbon monoxide, and methane. In this embodiment, since the reformed fuel obtained by reforming the liquid fuel is in a gaseous state, a reformed fuel will be sometimes referred to as a "reformed gas."

The reformed gas discharged from the fuel reformation chamber 23 is cooled in the reformed fuel cooler 52 while the reformed fuel flows through the reformed fuel supply passage 51. With this cooling, preignition of the reformed fuel in the output cylinder intake passage 43 and the combustion chamber 33 is suppressed or reduced with an increase in the density of the reformed gas. The cooled reformed gas is mixed with air flowing in the output cylinder intake passage 43 in the mixer 53, and the resultant mixture is introduced into the combustion chamber 33 of the output cylinder 3 together with an EGR gas introduced through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to a desired value.

In the compression stroke, the leaned mixed gas is adiabatically compressed in the output cylinder 3. When the piston 32 reaches the compression top dead point, a small amount of fuel having a high ignitability is injected from the injector 35. This ignites the air-fuel mixture compressed in the combustion chamber 33, and premixed combustion of the lean mixture is performed. In a case where the air-fuel mixture in the combustion chamber 33 can be self-ignited at a desired timing without injection of a small amount of fuel from the injector 35, fuel does not need to be injected from the injector 35.

With the above combustion, the piston 32 reciprocates to cause the crankshaft 11 to rotate, thereby obtaining an engine power. This engine power is transferred to, for example, the electric generator, and a part of the engine power is used as a driving source for reciprocation of the piston 22 in the fuel reformation cylinder 2.

In stopping supply of the reformed fuel to the output cylinder 3 due to, for example, emergency stop of the internal combustion engine 1, injection of the fuel from the injector 25 of the fuel reformation cylinder 2 is stopped, and the bypass amount adjusting valve 82 is opened. This introduces the reformed fuel into the exhaust passage 61 through the output cylinder bypass passage 81, and stops supply of the reformed fuel to the output cylinder 3 so that the internal combustion engine 1 can be quickly stopped.

With the internal combustion engine 1, uniform lean combustion of the lean mixture is performed in the output cylinder 3. The NOx emission and the soot emission can therefore be reduced. Thus, it is possible to eliminate or significantly reduce the capacity of a post-processing apparatus (such as a particulate filter or NOx catalyst) for purifying an exhaust gas. Further, since a fuel with a high anti-knock property is burnt, knocking is suppressed or reduced, and in addition, since diesel micro-pilot ignition in which light oil or other fuel is injected as described above enables combustion at a suitable timing, the combustion efficiency can be also increased.

The internal combustion engine 1 according to this embodiment further includes a reformed fuel composition adjusting unit for adjusting a composition of a reformed gas generated by the fuel reformation cylinder 2, and controls the reformed fuel composition adjusting unit in accordance with the operating state to adjust the composition of a reformed fuel to be supplied to the combustion chamber 33. The reformed fuel composition adjusting unit includes, for example, a part or the whole of a configuration for adjusting an equivalence ratio of an air-fuel mixture to be introduced into the fuel reformation cylinder 2, a configuration for adjusting a temperature of an air-fuel mixture formed in the fuel reformation cylinder 2, and a configuration for adjusting an effective compression ratio in the fuel reformation cylinder 2. The reformed fuel composition adjusting unit and actions of a control device therefor will now be described in detail.

First, a condition for enabling a reforming reaction in the fuel reformation chamber 23 of the fuel reformation cylinder 2 will be described. To enable the fuel reforming reaction in the fuel reformation chamber 23, the equivalence ratio of the air-fuel mixture in the fuel reformation chamber 23 and the temperature of the air-fuel mixture both need to be within a range that enables the reforming reaction. Further, the air-fuel mixture temperature required for causing the reforming reaction of the fuel is different depending on the equivalence ratio of the air-fuel mixture in the fuel reformation chamber 23. As the equivalence ratio increases, the temperature of the air-fuel mixture necessary for causing the reforming reaction increases.

The "air-fuel mixture temperature" here refers to a temperature of an air-fuel mixture including air introduced into the fuel reformation cylinder 2, the EGR gas, and the fuel injected from the injector 25 in a state where the air-fuel mixture has a minimum volume by the piston 22 in the reformation cylinder, and will be hereinafter referred to as a "compression end gas temperature." That is, to enable a reforming reaction in the fuel reformation chamber 23, the compression end gas temperature needs to be increased with an increase in the equivalence ratio of the air-fuel mixture in the fuel reformation chamber 23.

Figure 3:
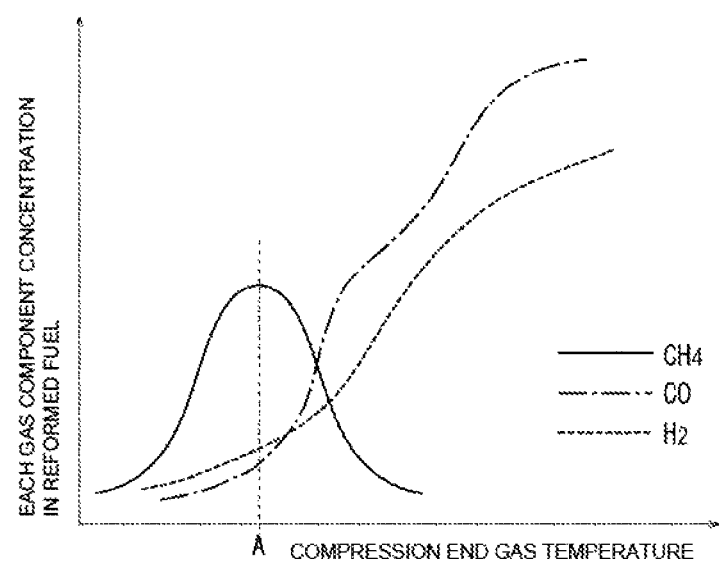
FIG. 3 A graph showing a relationship between a compression end gas temperature and a concentration of each gas component in a reformed fuel.

Next, the concentration of each gas component in the reformed fuel generated according to the compression end gas temperature will be described. FIG. 3 is a graph showing a relationship between the compression end gas temperature (abscissa) and the concentration of each gas component in the reformed fuel (ordinate) at an equivalence ratio, which resulted in experimental measurement.

In FIG. 3, the dotted line represents a relationship between the compression end gas temperature and the concentration of hydrogen in the reformed fuel generated. As can be understood from FIG. 3, the higher the compression end gas temperature, the higher the concentration of hydrogen in the reformed fuel generated. Further, in an area where the compression end gas temperature is relatively low and in an area where the compression end gas temperature is relatively high, the hydrogen concentration increases less with respect to an increase in the compression end gas temperature.

The chain line in FIG. 3 represents a relationship between the compression end gas temperature and the concentration of carbon monoxide in the reformed fuel generated. As can be understood from FIG. 3, the higher the compression end gas temperature, the higher the concentration of carbon monoxide in the reformed fuel generated. Further, there are several temperature zones where an increase in the carbon monoxide becomes less with respect to an increase in the compression end gas temperature. In other words, there are a plurality of inflection points in the change in the concentration of carbon monoxide associated with an increase in the compression end gas temperature.

In FIG. 3, the solid line represents a relationship between the compression end gas temperature and the concentration of methane in the reformed fuel generated. As can be understood from FIG. 3, in a range of the compressed end gas temperature from a predetermined value A and below, the concentration of methane in the reformed fuel generated increases with an increase in the compression end gas temperature. However, in the range of the compressed end gas temperature higher than the predetermined value A, the concentration becomes lower with an increase in the compression end gas temperature. In other words, a maximum value exists in the change in the concentration of methane associated with an increase in the compression end gas temperature. This is considered to be because, when the compression end gas temperature exceeds the predetermined value A, decomposition or partial oxidation reaction of methane in the reformed fuel progresses, resulting in generation of hydrogen, carbon monoxide, and the like.

As should be understood from this, the concentration of each gas component having a high anti-knock property in the reformed fuel depends on the compression end gas temperature. Further, it was confirmed that, if the equivalence ratio in the fuel reformation cylinder 2 changes, a change characteristic of the concentration of each gas component varies even if the compression end gas temperature is the same. Therefore, characteristics as shown in FIG. 3 in accordance with the equivalence ratio in the fuel reformation cylinder 2 are obtained so that the concentration ratio of each gas component can be adjusted by appropriately adjusting the compression end gas temperature in the fuel reformation cylinder 2 at the time of fuel reformation. The relationship between the compression end gas temperature and the concentration of each gas component as shown in FIG. 3 can be stored in the ECU 100 for each equivalence ratio in the fuel reformation cylinder 2.

Next, a procedure of calculating a target compression end gas temperature in order to achieve the adjustment of the compression end gas temperature described above will be described.

Figure 4:
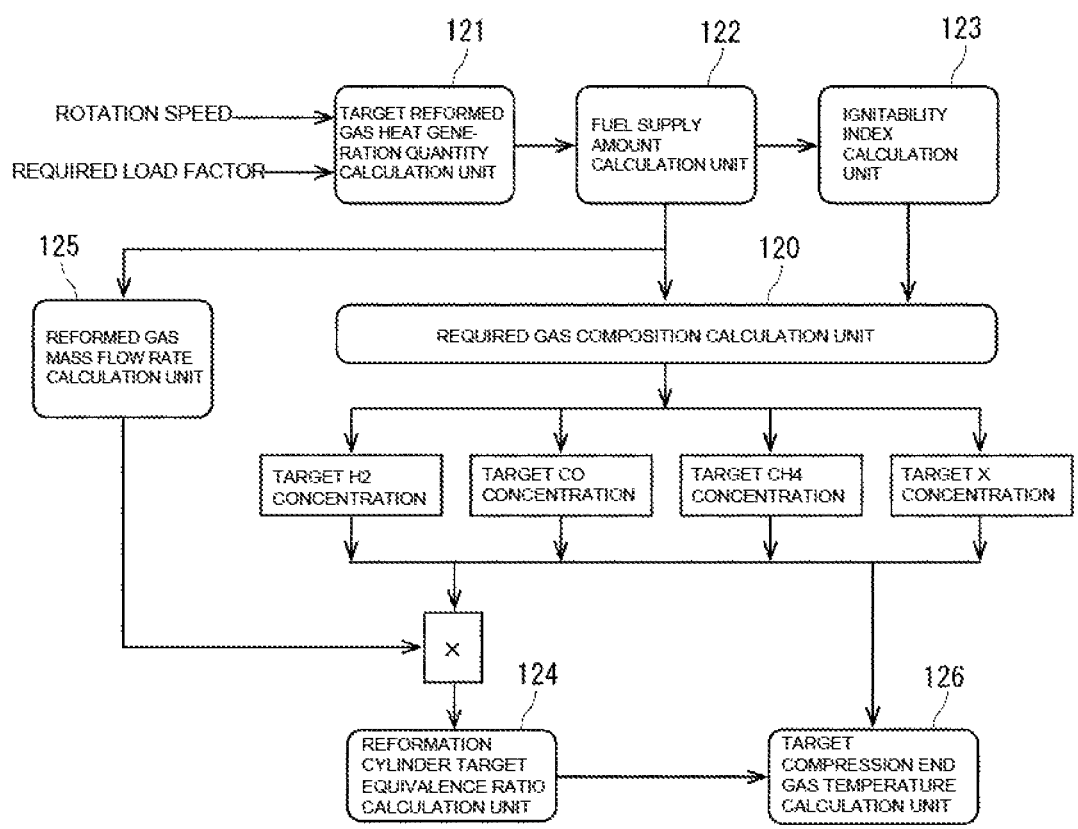
FIG. 4 A block diagram showing an arithmetic logic for calculating a target compression end gas temperature.

FIG. 4 is a block diagram showing an arithmetic logic of a target compression end gas temperature. Calculation of the target compression end gas temperature can be performed by the ECU 100. As shown in FIG. 4, first, from the operation state such as the rotation speed and the required load factor of the output cylinder 3 detected by the operating state detection unit described above, a target reformed gas heat generation quantity calculation unit 121 calculates a target reformed gas heat generation quantity $H_{tot\_req}$ by a reformed gas. The calculation procedure of the target reformed gas heat generation quantity $H_{tot\_req}$ by the target reformed gas heat generation quantity calculation unit 121 will be described with reference to FIG. 5.

Figure 5:
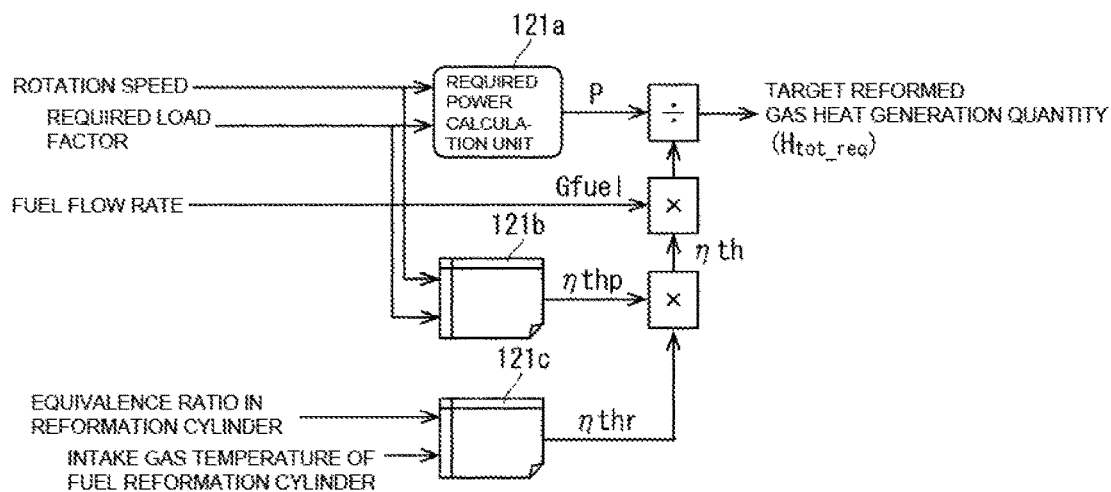
FIG. 5 A block diagram showing a specific calculation procedure for calculating a target reformed gas heat generation quantity in the arithmetic logic shown in FIG. 4.

First, as illustrated in FIG. 5, based on the rotation speed and the required load factor of the output cylinder 3, a required power calculation unit 121a calculates a required power P of the engine. In parallel with this calculation, a thermal efficiency $\eta$thp of the output cylinder 3 is obtained with reference to an output cylinder thermal efficiency map 121b using the rotation speed and the required load factor of the output cylinder 3 as parameters. Next, from a reformed efficiency map 121c of the fuel reformation cylinder 2 using, as parameters, the equivalence ratio of the fuel reformation cylinder 2 determined by the basic operation of the internal combustion engine 1 described above and the intake gas temperature, a reformation efficiency ηthr of the fuel reformation cylinder 2 is obtained. The thermal efficiency ηthp of the output cylinder 3 and the reformation efficiency ηthr of the fuel reformation cylinder 2 are multiplied, thereby calculating a thermal efficiency ηth of the entire internal combustion engine in the operating state at this time. Thereafter, the thermal efficiency ηth of the entire internal combustion engine and a fuel flow rate Gfuel are multiplied, and the required power P of the engine is divided by the product, thereby calculating a target reformed gas heat generation quantity $H_{tot\_req}$. The output cylinder thermal efficiency map 121b and the reformed efficiency map 121c may be created in advance through, for example, an experiment and stored in the ECU 100.

Referring back to FIG. 4, description continues. As described above, once the target reformed gas heat generation quantity $H_{tot\_req}$ has been calculated, a flow rate of fuel to be supplied to the fuel reformation cylinder 2 necessary for obtaining the target reformed gas heat generation quantity $H_{tot\_req}$ is calculated by a fuel supply amount calculation unit 122. The flow rate of the fuel supplied to the fuel reformation cylinder 2 is basically set in accordance with an engine required power, and is determined with reference to, for example, a map stored in the ECU 100.

Based on these pieces of information, ignitability in the output cylinder 3 is examined. In this example, an ignitability index calculation unit 123 calculates a typical ignitability index in the operating state. This ignitability index is calculated to be high with a higher load, and is determined in consideration of not only the required load factor but also the equivalence ratio in the output cylinder 3 and environmental conditions (cooling water temperature and intake gas temperature) detected by the operating state detection unit, for example. The target reformed gas heat generation quantity $H_{tot\_req}$, the flow rate of fuel to be supplied to the fuel reformation cylinder 2, and the ignitability index can be calculated by the ECU 100.

As described above, once the fuel flow rate is calculated in the fuel supply amount calculation unit 122, based on this flow rate, a required gas composition calculation unit 120 calculates a reformed gas composition that does not cause abnormal combustion such as preignition in the output cylinder 3 and is capable of obtaining a target power (required power) to be output from the internal combustion engine (required gas composition). More specifically, in a case where the internal combustion engine 1 has a low load, the gas composition of the reformed gas is set such that the proportion of hydrogen and/or carbon monoxide in the reformed gas is larger than that in a case where the internal combustion engine 1 has a high load. In the case where the internal combustion engine 1 has the high load, the gas composition of the reformed gas is set such that the proportion of methane in the reformed gas is larger than that in the case where the internal combustion engine 1 has a low load.

Here, the state where the internal combustion engine 1 has a low load is a state where the internal combustion engine 1 is operated in an operating state where the combustion rate after micro-pilot ignition is low and an unburned gas is easily emitted. The state where the internal combustion engine 1 has a high load is a state where the internal combustion engine 1 is operated in an operating condition where abrupt combustion easily occurs before micro-pilot ignition or immediately after ignition. Supposing an operating condition where the load is low is a first operating condition and an operating condition where the load is high is a second operating condition in the internal combustion engine 1, the combustion rate after micro-pilot ignition in the first operating condition is lower than the combustion rate after micro-pilot ignition in the second operating condition. Although not particularly limited, in terms of a load factor in power of the internal combustion engine 1, for example, a state where the equivalence ratio of the lean air-fuel mixture is 0.5 or less and the power of the internal combustion engine 1 is 50% or less of the rated power can be the state where the internal combustion engine 1 has a low load, and the other states can be the state where the internal combustion engine 1 has a high load. It should be noted that the level of the load of the internal combustion engine 1 in this embodiment is mainly determined based on the level of the combustion rate after ignition, and is not determined only by a load factor.

As described above, the composition of the reformed gas is set in accordance with the load of the internal combustion engine 1. A proportion of hydrogen in the reformed gas in a case where the operating condition of the internal combustion engine 1 is the first operating condition is set to be larger than a proportion of hydrogen in the reformed gas in a case where the operating condition of the internal combustion engine 1 is the second operating condition. A proportion of carbon monoxide in the reformed gas in the case where the operating condition of the internal combustion engine 1 is the first operating condition is set to be larger than a proportion of carbon monoxide in the reformed gas in the case where the operating condition of the internal combustion engine 1 is the second operating condition. In addition, a proportion of methane in the reformed gas in the case where the operating condition of the internal combustion engine 1 is the second operating condition is set to be larger than a proportion of methane in the reformed gas in the case where the operating condition of the internal combustion engine 1 is the first operating condition.

Figure 6:
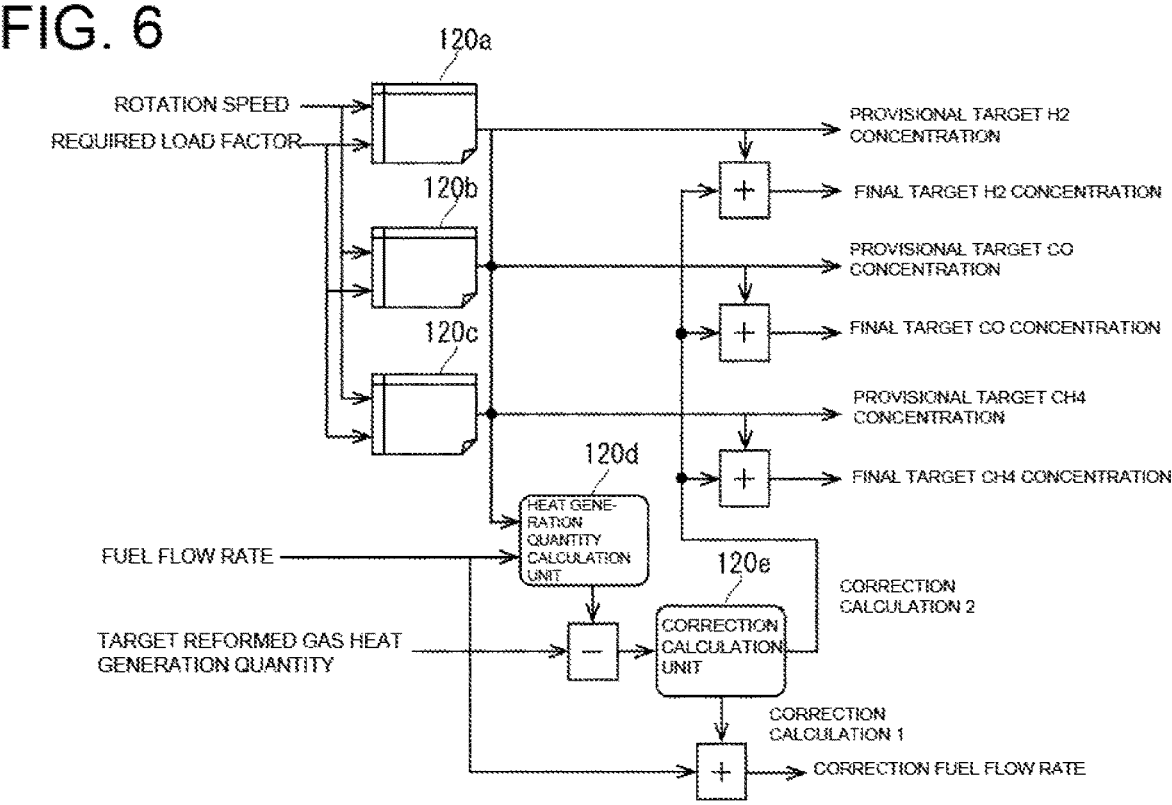
FIG. 6 A block diagram showing a specific calculation procedure for performing required gas composition calculation in the arithmetic logic shown in FIG. 4.

Based on the data described above, the required gas composition calculation unit 120 calculates a required gas composition at the outlet of the fuel reformation cylinder 2. With reference to FIG. 6, a specific calculation procedure of the required gas composition by the required gas composition calculation unit 120 will be described. The calculation of the required gas composition can be performed by the ECU 100.

As illustrated in FIG. 6, the required gas composition calculation unit 120 sets each gas concentration by referring to a target hydrogen concentration map 120a, a target carbon monoxide concentration map 120b, and a target methane concentration map 120c. These maps 120a through 120c are two-dimensional maps using, as parameters, the rotation speed detected by the rotation speed sensor 107 of the output cylinder 3 and the required load factor detected by the accelerator lever opening degree sensor 108. For example, the target hydrogen concentration map 120a is set such that the proportion of hydrogen included in the reformed fuel is larger in the case of a low required load factor than that in the case of a high required load factor, and the proportion of hydrogen included in the reformed fuel is larger in the case of a high rotation speed of the output cylinder 3 than that in the case of a low rotation speed. The target carbon monoxide concentration map 120b is set such that the proportion of carbon monoxide included in the reformed fuel is larger in the case of a low required load factor than that in the case of a high required load factor, and the proportion of carbon monoxide included in the reformed fuel is larger in the case of a high rotation speed of the output cylinder 3 than that in the case of a low rotation speed. The target methane concentration map 120c is set such that the proportion of methane included in the reformed fuel is larger in the case of a high required load factor than that in the case of a low required load factor, and the proportion of methane included in the reformed fuel is smaller in the case of a high rotation speed of the output cylinder 3 than that in the case of a low rotation speed. The maps 120a through 120c are set based on, for example, experiment performance of the output cylinder 3, and can be previously stored in the ECU 100.

Once the target concentration of each gas component is calculated based on the maps 120a through 120c illustrated in FIG. 6, the calculated target concentration is output to a heat generation quantity calculation unit 120d as a provisional target concentration for each gas component. The heat generation quantity calculation unit 120d calculates a heat generation quantity in a case where each gas component is supplied to the output cylinder 3 in a provisional target concentration. The heat generation quantity calculation unit 120d receives a fuel flow rate calculated by the fuel supply amount calculation unit 122. The heat generation quantity calculation unit 120d calculates an expected calculated heat generation quantity ($H_{tot\_cal}$) based on this fuel flow rate and a provisional target concentration $\psi_i$ of each gas component. This calculated heat generation quantity can be obtained by converting the provisional target concentration $\psi_i$ of each gas component and the fuel flow rate to a target mole flow rate $N_i$ and using Equation (1) below. In Equation (1), $H_i$ is a heat generation quantity of each gas component i.

[Equation 1]

$$H_{tot\_cal} = \sum_i N_i \cdot H_i \quad (1)$$

In a case where the calculated heat generation quantity $H_{tot\_cal}$ coincides with the target reformed gas heat generation quantity $H_{tot\_req}$ calculated by the target reformed gas heat generation quantity calculation unit 121 or a deviation between these heat generation quantities are small enough to be negligible, the fuel flow rate calculated by the fuel supply amount calculation unit 122 is used as a fuel flow rate to be supplied to the fuel reformation cylinder 2 without change. In a case where the deviation is large, however, correction calculation is preferably performed based on a correction calculation unit 120e in order to reduce the deviation. Specific correction calculation performed by the correction calculation unit 120e will now be described.

First, as specific correction calculation performed by the correction calculation unit 120e, description will be given on a correction calculation 1 performed based on Equation (2) below. In the correction calculation 1, a corrected value for a fuel flow rate is calculated.

[Equation 2]

$$G_{fuel\_cor} = \frac{P}{\eta_{th}(H_{tot\_req} - H_{tot\_cal})} \quad (2)$$

As shown in Equation (2), in the correction calculation 1, a required power P calculated by the required power calculation unit 121a is divided by a value obtained by multiplying the thermal efficiency $\eta$th of the entire internal combustion engine and a deviation between the target reformed gas heat generation quantity $H_{tot\_req}$ and the calculated heat generation quantity $H_{tot\_cal}$ obtained by Equation (1). In this manner, a fuel flow rate corrected value $G_{fuel\_cor}$ can be obtained. The fuel flow rate corrected value $G_{fuel\_cor}$ is added to the fuel flow rate so that the calculated heat generation quantity $H_{tot\_cal}$ can approach or coincide with the target reformed gas heat generation quantity $H_{tot\_req}$.

Next, as a specific example of the correction calculation, a correction calculation 2 based on Equation (3) and Equation (4) below will be described. In the correction calculation 2, a correction value for the concentration of each gas component in the reformed gas is calculated.

[Equation 3]

$$\Delta N_{tot} = \frac{H_{tot\_cal}}{\Delta H_{tot}} \quad (3)$$

[Equation 4]

$$\Delta N_{tot} = \sum \Delta N_i = \sum \alpha_i \cdot N_{i\_ref} \quad (4)$$

In the correction calculation 2, first, from Equation (3), the calculated heat generation quantity $H_{tot\_cal}$ is divided by a combustion heat deviation $\Delta H_{tot}$ calculated based on a deviation between the target reformed gas heat generation quantity $H_{tot\_req}$ and the calculated heat generation quantity $H_{tot\_cal}$, thereby obtaining a reformed gas total mole number corrected value $\Delta N_{tot}$. Thereafter, based on the reformed gas total mole number corrected value $N_{tot}$, a reference mole concentration corrected value $\psi_{i\_ref}$ of each gas component (hydrogen, carbon monoxide, and methane) is obtained. The reference mole concentration corrected value $\psi_{i\_ref}$ can be obtained by using a standard correction chemical species concentration map previously stored in the ECU 100. Based on the reference mole concentration corrected value $\psi_{i\_ref}$ a mole number corrected value $\Delta N_i$ of each gas component constituting the reformed gas total mole number corrected value $N_{tot}$ is obtained, where i represents a chemical species of each gas component constituting the reformed gas. As shown in Equation (4), the sum of mole number corrected values $\Delta N_i$ of gas components is the reformed gas total mole number corrected value $N_{tot}$. In an actual situation, an error occurs because of, for example, a change in gas composition. Thus, an adjustment coefficient $\alpha_i$ is predetermined for each gas component, and $N_{i\_ref}$ satisfying Equation (4) is calculated to obtain $\Delta N_i = \alpha_i \cdot N_{i\_ref}$. By using $N_{i\_ref}$ as a mole number corrected value, correction is performed with adjustment of the provisional target concentration of each gas component calculated in FIG. 6. In this manner, the calculated heat generation quantity $H_{tot\_cal}$ can also approach or coincide with the target reformed gas heat generation quantity $H_{tot\_req}$.

Referring back to FIG. 4, description continues. Since it is necessary to supply an amount of reformed fuel that can satisfy the power of the output cylinder 3 while achieving the required gas composition, a reformation cylinder target equivalence ratio calculation unit 124 calculates an equivalence ratio to be considered as a target, in consideration of a total heat generation quantity of the reformed fuel. At this time, based on the fuel flow rate to the fuel reformation cylinder 2 calculated by the fuel supply amount calculation unit 122, a mass flow rate of the reformed gas is calculated in a reformed gas mass flow rate calculation unit 125. The mass flow rate of the reformed fuel is multiplied by a target concentration of each gas component so that a mass flow rate of each gas component is calculated, and based on this, a target equivalence ratio of the fuel reformation cylinder 2 in consideration of the total heat generation quantity of the reformed gas is calculated. The foregoing description has been directed to obtaining target concentrations of hydrogen, carbon monoxide, and methane in calculating a target concentration of each gas component. However, gas components whose target concentrations are obtained are not limited to hydrogen, carbon monoxide, and methane, and a target concentration of another gas component X (e.g., ethane) included in the reformed gas may be obtained.

Once the target equivalence ratio is calculated in the manner described above, a target compression end gas temperature calculation unit 126 calculates a target compression end gas temperature in accordance with a final target concentration of each gas component and a target equivalence ratio of the fuel reformation cylinder 2. The target compression end gas temperature is determined with reference to the proportion of each gas component concentration in accordance with the compression end gas temperature shown in FIG. 3. As described above, by changing the compression end gas temperature in accordance with the equivalence ratio, the concentration proportion of each gas component can be adjusted to a desired proportion. The target compression end gas temperature calculation unit 126 refers to a relationship between the compression end gas temperature corresponding to the target equivalence ratio and each gas component concentration (see FIG. 3), and determines a target compression end gas temperature at which the final target concentration of each gas component can be achieved.

Once the target compression end gas temperature is calculated as described above, the ECU 100 performs control for adjusting an actual compression end gas temperature of the internal combustion engine 1 to a target compression end gas temperature. To adjust the compression end gas temperature in the fuel reformation chamber 23 to the target compression end gas temperature, it is necessary to calculate a current compression end gas temperature and perform a temperature adjustment operation in accordance with a deviation between the current compression end gas temperature and the target compression end gas temperature. With this temperature adjustment operation, when the compression end gas temperature is adjusted to the target compression end gas temperature, the composition of the reformed fuel can be made a desired target composition, that is, the concentration of each gas component can be made a target concentration. A configuration for specifically performing this temperature adjustment operation corresponds to a reformed fuel composition adjusting unit.

A procedure for calculating an actual compression end gas temperature necessary for adjusting the compression end gas temperature to the target compression end gas temperature will now be described.

The actual compression end gas temperature in the fuel reformation chamber 23 can be calculated (estimated) by Equation (5):

[Equation 5]

$$T_{TDC} = C_{react} \cdot T_{ini} \cdot \varepsilon^{\kappa-1} \quad (5)$$

In Equation (5), $T_{TDC}$ is a compression end gas temperature, $T_{ini}$ is a gas temperature before compression, that is, a temperature of an intake gas, $\varepsilon$ is an effective compression ratio of the fuel reformation cylinder 2, $\kappa$ is a polytropic index of an intake gas in the fuel reformation chamber 23, and $C_{react}$ is a correction factor taken in consideration of a temperature increase by a reformation reaction (especially partial oxidation reaction) in the fuel reformation chamber 23.

It will be described how each parameter in Equation (5) is calculated.

(Intake Gas Temperature $T_{ini}$)

An intake gas temperature $T_{ini}$ is calculated based on an output signal from the intake-gas temperature sensor 103. The intake gas temperature $T_{ini}$ calculated here is an intake gas temperature downstream of a portion of the fuel reformation cylinder EGR passage 71 communicating with the fuel reformation cylinder intake passage 42.

The intake gas temperature $T_{ini}$ may be a temperature of an intake gas flowing in the intake port of the fuel reformation cylinder 2, instead of the temperature of an intake gas flowing in the fuel reformation cylinder intake passage 42. A gas temperature in the fuel reformation chamber 23 at the time when the piston 22 reaches an intake bottom dead point may be detected or estimated to be used as the intake gas temperature $T_{ini}$.

(Effective Compression Ratio $\varepsilon$ of Fuel Reformation Cylinder)

The effective compression ratio $\varepsilon$ of the fuel reformation cylinder 2 is calculated as a ratio between a volume of the fuel reformation chamber 23 at the time when the intake valve 26 in the fuel reformation cylinder 2 is closed and a volume of the fuel reformation chamber 23 at the time when the piston 22 reaches the compression top dead point. In a case where control of the compression end gas temperature described later is not performed by controlling the effective compression ratio, the effective compression ratio $\varepsilon$ of the fuel reformation cylinder 2 may be simply obtained from a ratio between a volume of the fuel reformation chamber 23 at the time when the piston 22 is at the bottom dead point and a volume of the fuel reformation chamber 23 at the time when the piston 22 is at the top dead point.

(Polytropic Index $\kappa$)

The polytropic index $\kappa$ is defined as a ratio between a specific heat at constant pressure and a specific heat at constant volume in a gas compression stroke in the fuel reformation chamber 23. If the total volume of the intake gas is air and no heat outflows to the cylinder wall surface, $\kappa$ is about 1.4. However, an actual polytropic index $\kappa$ of an intake gas in the fuel reformation chamber 23 is different from those in the case where the total volume is air and the case where no heat outflow occurs, correction is performed in the following manner.

Correction of Polytropic Index in Accordance With Cooling Water Temperature

The polytropic index $\kappa$ varies in accordance with the amount of a heat loss. As described above, the cylinder block includes the cooling water passage 13, and heat outflow occurs toward cooling water flowing in the cooling water passage 13. Thus, a temperature of the cooling water is calculated based on an output from the water temperature sensor 106. The cooling water temperature is a parameter for causing a heat loss, and thus, a map for obtaining a correction polytropic index $\Delta\kappa$ to be subtracted from a polytropic index $\kappa$ of air using the cooling water temperature as a parameter is determined beforehand through an example or a simulation, for example. In this manner, the correction polytropic index $\Delta\kappa$ in accordance with the cooling water temperature can be obtained.

Correction of Polytropic Index κ in Accordance With Gas Composition

The polytropic index κ also varies depending on the gas composition of the fuel reformation chamber 23. As described above, in the case where the total volume of the intake gas is air, since a most part of the intake gas is diatomic molecules, the polytropic index κ is about 1.4. On the other hand, in a case where the intake gas contains a burned gas ($CO_2$, $H_2O$) or fuel (reformed gas in this embodiment), the proportion of the diatomic molecules decreases, and the polytropic index κ decreases accordingly.

In view of this, based on the output signal from the intake-gas O2 sensor 104, a mole fraction of carbon dioxide in the intake gas is calculated by using the mole fraction of oxygen in the intake gas. Then, based on the mole fraction of each gas component, the polytropic index κ is estimated.

In estimating the polytropic index κ, first, a molar heat at constant pressure of the intake gas is obtained by Equation (6):

[Equation 6]

$$C_{p\_intake} = \sum_i \Psi_i \cdot C_{p\_i} \quad (6)$$

In Equation (6), $C_{p\_intake}$ is a molar heat at constant pressure of the intake gas, $\psi_i$ is a mole fraction of each gas component, and $C_{p\_i}$ is a molar heat at constant pressure of each gas component. The mole fraction $\psi_i$ of each gas component and the molar heat at constant pressure $C_{p\_i}$ of each gas component are defined in accordance with, for example, the type of the fuel and an equivalence ratio at the time of calculation in the fuel reformation chamber 23 and can be obtained in accordance with a map created based on an experiment or a simulation.

Consequently, the polytropic index κ of the intake gas can be calculated by Equation (7):

[Equation 7]

$$\kappa = \frac{C_{p\_intake}}{C_{p\_intake} - 8.314} \quad (7)$$

Correction of Polytropic Index κ in Accordance With Equivalence Ratio

The equivalence ratio in the fuel reformation chamber 23 may be estimated so that correction calculation of the polytropic index κ can be performed using this equivalence ratio.

First, an equivalence ratio in accordance with a current operating state is calculated. To calculate an equivalence ratio, a flow rate of the intake air is calculated based on an output signal from the intake-air flow rate sensor 101. The amount of EGR gas returned to the fuel reformation cylinder 2 is calculated from a difference between a pressure of the intake gas calculated based on an output signal from the intake-gas pressure sensor 102 and a pressure of exhaust air calculated based on an output signal from the exhaust-gas pressure sensor 105. Then, an equivalence ratio is calculated from the flow rate of the intake air, the EGR gas amount, and the amount of fuel supply to the fuel reformation chamber 23 (fuel reformation cylinder supply amount obtained from an injection instruction value to the injector 25).

Once the equivalence ratio is calculated as described above, from this equivalence ratio, the amount of decrease Δκ in polytropic index κ, that is, a correction polytropic index Δκ, is obtained. The correction polytropic index Δκ can be obtained by referring to the map in which the correction polytropic index Δκ in accordance with the equivalence ratio is obtained through, for example, an experiment or a simulation and is stored previously. In this manner, the correction polytropic index Δκ is obtained, and is subtracted from the polytropic index κ (about 1.4) from the air, thereby calculating a polytropic index κ in accordance with the equivalence ratio.

(Correction Factor $C_{react}$ for Temperature Increase With Reformation Reaction)

The correction factor $C_{react}$ for a temperature increase with reformation reaction is used for correcting the compression end gas temperature by a degree corresponding to an increase in gas temperature caused by partial oxidation reaction in a case where reformation reaction starts before the piston 22 reaches the compression end gas temperature top dead point. By obtaining the start time of reformation reaction with respect to an operating condition or the quantity of heat generation caused by partial oxidation reaction through, for example, an experiment, the correction factor $C_{react}$ for the temperature increase is stored in the ROM and a correction factor $C_{react}$ for a temperature increase in accordance with an actual operating condition can be read out.

In the manner described above, the intake gas temperature $T_{ini}$, the effective compression ratio ε of the fuel reformation cylinder, the polytropic index κ, the correction factor $C_{react}$ for a temperature increase with reformation reaction are obtained, and an operation of calculating a compression end gas temperature can be performed based on Equation (5) stored in the ECU 100 as a control device. The calculation of the compression end gas temperature is not limited to the embodiment described above, and may be performed by other methods. Specifically, a pressure sensor may be disposed in the fuel reformation cylinder 2 so that a compression end gas temperature can be calculated based on a value of the pressure sensor.

In the manner described above, based on calculation of the target compression end gas temperature and a current compression end gas temperature, the current compression end gas temperature is adjusted to approach the target compression end gas temperature. Control for adjusting the compression end gas temperature will now be described. Examples of specific control of the compression end gas temperature include control of the compression end gas temperature by adjusting an equivalence ratio of the fuel reformation cylinder 2, control of the compression end gas temperature by controlling the temperature of an intake gas taken into the fuel reformation cylinder 2, and/or control of the compression end gas temperature by adjusting an effective compression ratio of the fuel reformation cylinder.

(Control of Compression End Gas Temperature by Adjusting Equivalence Ratio)

First, control of adjusting the compression end gas temperature by adjusting the equivalence ratio will be described. In controlling the compression end gas temperature by adjusting the equivalence ratio, it is not preferable to change the amount of fuel supply to the fuel reformation chamber 23 in order to satisfy a required power. Thus, in the case of adjusting the compression end gas temperature by adjusting the equivalence ratio, the proportion of the intake gas except for fuel to be supplied to the fuel reformation cylinder 2 is changed so that the oxygen concentration is changed. In this manner, the compression end gas temperature is adjusted.

As described above, it is known that the compression end gas temperature varies depending on the polytropic index κ. The polytropic index κ can be adjusted by adjusting the amount of EGR gas (burned gas) to be supplied to the fuel reformation chamber 23 as described above. Thus, by adjusting the EGR gas amount, the oxygen concentration in the fuel reformation chamber 23, that is, the equivalence ratio, is adjusted, and the amount of partial oxygen reaction in reformation reaction in the fuel reformation chamber 23 is changed so that the compression end gas temperature can be adjusted. In this manner, the equivalence ratio is adjusted to change the polytropic index κ, thereby adjusting the compression end gas temperature.

Figure 7:
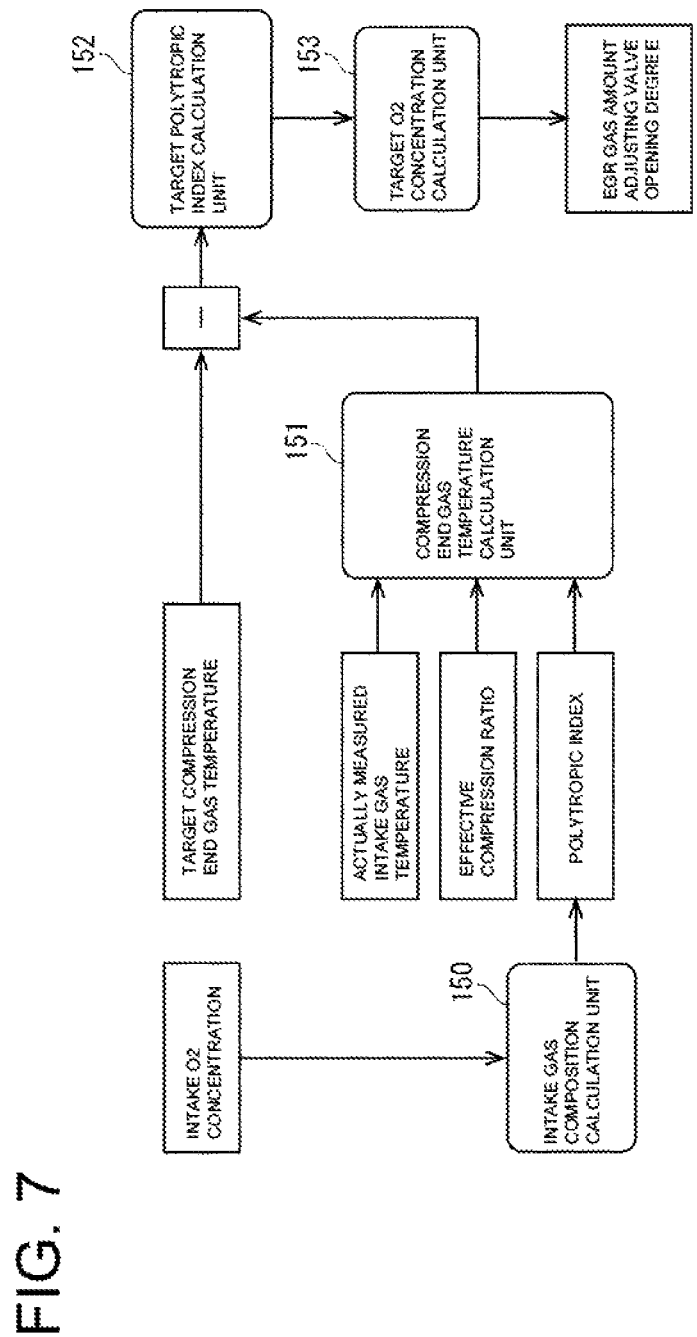
FIG. 7 A block diagram showing an arithmetic logic for determining an opening degree of an EGR gas amount adjusting valve in order to adjust an equivalence ratio.

FIG. 7 is a block diagram showing an arithmetic logic for determining an opening degree of the EGR gas amount adjusting valve 73. As shown in FIG. 7, an intake gas composition calculation unit 150 calculates a composition of the intake gas based on the oxygen concentration in the intake gas calculated based on the output signal from the intake $O_2$ sensor 104. The polytropic index κ of the intake gas is then obtained from the composition of the intake gas. A compression end gas temperature calculation unit 151 calculates a current compression end gas temperature, based on the measured intake gas temperature, the current effective compression ratio, and the polytropic index κ. Then, based on a deviation between the current compression end gas temperature and the target compression end gas temperature, a target polytropic index calculation unit 152 calculates a target polytropic index. Then, based on this target polytropic index, a target $O_2$ concentration calculation unit 153 calculates a target $O_2$ concentration. Then, an output signal corresponding to the target $O_2$ concentration, which is the result of the calculation, is output to the EGR gas amount adjusting valve 73. The relationship between the target $O_2$ concentration and the opening degree of the EGR gas amount adjusting valve 73 is determined in advance through an experiment or a simulation. From this relationship, the opening degree of the EGR gas amount adjusting valve 73 corresponding to the output is set.

With such a logic, the equivalence ratio is changed by adjusting the EGR gas amount, thereby performing control of the compression end gas temperature. At this time, control is performed such that the equivalence ratio is high in a case where the internal combustion engine has a high load. That is, the EGR gas amount is adjusted to be large in order to reduce the oxygen amount in the air-fuel mixture, and the polytropic index κ is corrected. In this manner, the compression end gas temperature is adjusted. The EGR gas amount to be adjusted and the amount of change in the compression end gas temperature corresponding to the EGR gas amount are obtained in advance through, for example, an experiment or a simulation, and the degree of adjustment of the EGR gas amount is determined. With the foregoing logic, control of the compression end gas temperature is performed.

(Control of Compression End Gas Temperature by Adjusting Intake Gas Temperature)

A parameter contributing to adjustment of the temperature of an intake gas introduced into the fuel reformation cylinder 2 is the temperature of the EGR gas. Control of the compression end gas temperature using the temperature of the EGR gas is performed by controlling the opening degree of the bypass amount adjusting valve 75. Specifically, the amount of the EGR gas that bypasses the EGR gas cooler 72 is adjusted so that the temperature of the EGR gas introduced into the fuel reformation cylinder intake passage 42 is thereby adjusted.

Figure 8:
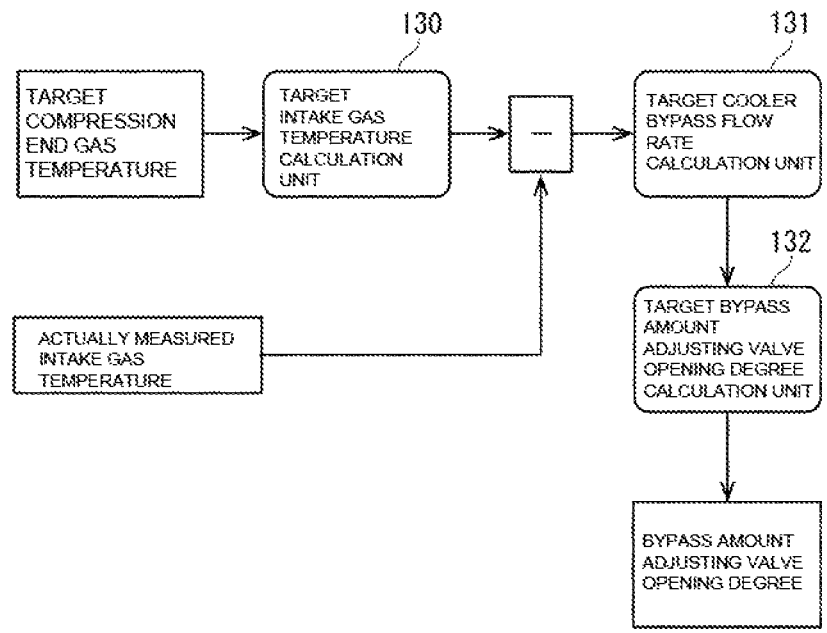
FIG. 8 A block diagram showing an arithmetic logic for determining an opening degree of a bypass amount adjusting valve in order to adjust an intake gas temperature.

FIG. 8 is a block diagram showing an arithmetic logic for determining an opening degree of the bypass amount adjusting valve 75. As shown in FIG. 8, based on the target compression end gas temperature, a target intake gas temperature calculation unit 130 calculates a target taken-in gas temperature. Then, based on a deviation between the actual intake gas temperature actually measured by the intake gas temperature sensor 103 and the target intake gas temperature, the target cooler bypass flow rate calculation unit 131 calculates the flow rate of the EGR gas that bypasses the EGR gas cooler 72. Then, based on the flow rate of EGR gas bypassing the EGR gas cooler 72, a target bypass amount adjusting valve opening degree calculation unit 132 calculates the target opening degree of the bypass amount adjusting valve 75. The relationship between the flow rate of EGR gas (flow rate of EGR gas bypassing the EGR gas cooler 72) and the opening degree of the bypass amount adjusting valve 75 is determined in advance through an experiment or a simulation, and the target opening degree of the bypass amount adjusting valve 75 is calculated based on this relationship. Then, an output signal corresponding to the target opening degree, which is the result of the calculation, is output to the bypass amount adjusting valve 75. Such control is performed so that in the case where the internal combustion engine has a high load, the temperature of the intake gas introduced into the fuel reformation cylinder 2 is controlled to be higher than that in the case where the internal combustion engine has a low load. With the foregoing arithmetic logic, control of the compression end gas temperature is performed.

In the embodiment described, above, the temperature of the intake gas is adjusted by adjusting the opening degree of the bypass amount adjusting valve 75. However, the present invention is not limited to this example, and the temperature of the EGR gas may be adjusted by maintaining the opening degree of the bypass amount adjusting valve 75 constant and adjusting the temperature and the flow rate of the heat sink flowing in the EGR gas cooler 72 (cooling water of the internal combustion engine).

(Control of Compression End Gas Temperature by Adjusting Effective Compression Ratio of Fuel Reformation Cylinder)

Next, control of the compression end gas temperature by changing the effective compression ratio of the fuel reformation cylinder will be described. The control of the compression end gas temperature by changing the effective compression ratio is achieved by adjusting the opening/closing timing of the intake valve 26 with the variable valve unit 28 included in the fuel reformation cylinder 2. In other words, the compression end gas temperature is adjusted by directly adjusting the effective compression ratio ε in Equation (5) above. Examples of the variable valve unit 28 include a conventionally known valve unit that changes a cam phase, a valve unit that changes a cam lift, and an electromagnetically driven valve device. The variable valve unit 28 is not limited to a configuration of the variable valve device.

Figure 9:
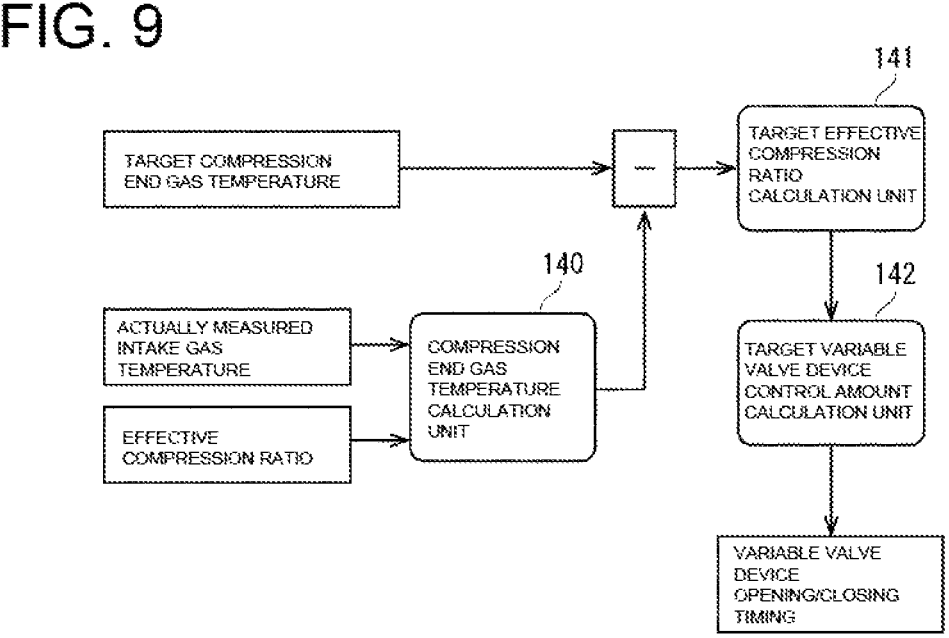
FIG. 9 A block diagram showing an arithmetic logic for determining a control amount of a variable valve unit in order to adjust an effective compression ratio.

FIG. 9 is a block diagram showing an arithmetic logic for determining a control amount of variable valve unit 28. As shown in FIG. 9, a compression end gas temperature calculation unit 140 calculates a current compression end gas temperature, based on an actually measured intake gas temperature and a current effective compression ratio. Then, based on a deviation between the current compression end gas temperature and the target compression end gas temperature, a target effective compression ratio calculation unit 141 calculates a target effective compression ratio. Then, based on this target effective compression ratio, a target variable valve device control amount calculation unit 142 calculates an opening/closing timing of the variable valve unit 28. Then, an output signal corresponding to the control amount, which is the result of the calculation, is output to the variable valve unit 28. For example, when the current compression end gas temperature is lower than the target compression end gas temperature and the effective compression ratio needs to be increased, the timing of opening and closing the intake valve 26 by the variable valve unit 28 is shifted toward the bottom dead point of the piston 22. On the other hand, when the current compression end gas temperature is higher than the target compression end gas temperature and the effective compression ratio needs to be reduced, the timing of closing the intake valve 26 by the variable valve unit 28 is shifted toward the top dead point of the piston 22. With the foregoing arithmetic logic, control of the compression end gas temperature is performed.

The means for controlling the compression end gas temperature described above, that is, the control of the compression end gas temperature by adjusting the equivalence ratio, the control of the compression end gas temperature by adjusting the intake gas temperature, and the control of the compression end gas temperature by adjusting the effective compression ratio of the reformation cylinder, are performed so that the actual compression end gas temperature can be adjusted to the target compression end gas temperature. Accordingly, the composition of the reformed fuel generated by the fuel reformation cylinder 2 constituting the fuel reforming unit, that is, the concentration of each gas component constituting the reformed gas, is adjusted to the target gas component concentration.

At least one of the EGR gas amount adjusting valve 73 as a component for adjusting the equivalence ratio, the bypass amount adjusting valve 75 as a component for adjusting the intake gas temperature, and the variable valve unit 28 as a component for adjusting the effective compression ratio of the reformation cylinder constitutes a "reformed fuel composition adjusting unit." By executing at least one of adjustment of the equivalence ratio, adjustment of the intake gas temperature, and adjustment of the effective compression ratio of the reformation cylinder, control of the compression end gas temperature constitutes "control of the reformed fuel composition adjusting unit" in order to adjust the composition of the reformed fuel. The control of the reformed fuel composition adjusting unit is not limited to the embodiment described above. More specifically, as understood from the calculation of the compression end gas temperature in the fuel reformation cylinder 2 by Equation (5), the compression end gas temperature can be adjusted by changing the values of the parameters in Equation (5). That is, control of the reformed fuel composition adjusting unit can be rendered as a change of the value of a parameter in Equation (5). For example, in a case where the fuel reformation cylinder 2 is configured independently of the output cylinder 3, or a case where the crankshaft 11 rotated from the output cylinder 3 and the crankshaft for rotating the fuel reformation cylinder 2 are coupled to each other by a transmission or the like and a transmission ratio is freely changed, the rotation speed of the shaft for driving the piston 22 of the fuel reformation cylinder 2 can be freely adjusted, and the amount of heat outflow from the air-fuel mixture including the intake gas introduced into the fuel reformation chamber 23 and supplied fuel can be changed by adjusting the rotation speed of the fuel reformation cylinder 2. As described for Equation (5), the polytropic index κ changes by changing the amount of heat outflow in the fuel reformation chamber 23. Thus, the compression end gas temperature can also be changed.

The embodiment described above merely provides a simple example, and various forms are conceivable.

In the example described in the above embodiment, the internal combustion engine including the reciprocation-type fuel reformation cylinder as a fuel reforming unit to which a liquid fuel including hydrocarbon is supplied and which generates a reformed fuel having a higher octane number than the supplied liquid fuel. However, the present invention is not limited to this example, and a known reforming catalyst may be used as a reformer. As a reforming catalyst, a catalyst using a known material such as $Pt/CeO_2$ can be employed. In employing such a reforming catalyst, a fuel to be reformed is supplied from an injector disposed upstream of the reforming catalyst, and at the same time, an exhaust gas including steam is supplied. In the case of changing the composition of the reformed gas in the case of employing such a reforming catalyst, the concentration of each gas component can be adjusted by changing, for example, the temperature or the equivalence ratio of a gas to be taken.

In the description of the embodiment, the present invention is directed to the internal combustion engine applicable to a stationary type electric generator. However, the present invention is not limited to this example, and may be applied to other purposes such as ships and vehicles.

REFERENCE SIGNS LIST

1: internal combustion engine
2: fuel reformation cylinder
3: output cylinder
4: intake system
5: reformed fuel supply system
6: exhaust system
7: EGR system
8: output cylinder bypass system
11: crankshaft
21, 31: cylinder bore
22, 32: piston
100: ECU
120: required gas composition calculation unit
130: target intake gas temperature calculation unit
140: compression end gas temperature calculation unit
150: intake gas composition calculation unit

The invention claimed is:

1. An internal combustion engine comprising:
an operating state detection unit configured to detect an operating state of the internal combustion engine;
a fuel reforming unit including a reformation cylinder in which a piston is configured to reciprocate in a cylinder, the fuel reforming unit configured to be supplied with a liquid fuel including hydrocarbon, the fuel reforming unit further configured to generate a reformed fuel having an octane number larger than that of the liquid fuel supplied to the fuel reforming unit;
a reformed fuel composition adjusting unit configured to adjust a composition of the reformed fuel generated by the fuel reforming unit and adjust at least one of an effective compression ratio, an intake gas temperature, an equivalence ratio, and a rotation speed in the reformation cylinder; and
a control device configured to control the reformed fuel composition adjusting unit in accordance with the operating state detected by the operating state detection unit and adjust the composition of the reformed fuel such that an equivalence ratio of an air-fuel mixture received by the reforming unit increases based on an increase of an engine load.

2. The internal combustion engine according to claim 1, wherein the control device is configured to control the reformed fuel composition adjusting unit such that a proportion of hydrogen included in the reformed fuel when the internal combustion engine has a low load becomes larger than a proportion of hydrogen included in the reformed fuel when the internal combustion engine has a high load.

3. The internal combustion engine according to claim 1, wherein the control device is configured to control the reformed fuel composition adjusting unit such that a proportion of carbon monoxide included in the reformed fuel when the internal combustion engine has a low load becomes larger than a proportion of carbon monoxide included in the reformed fuel when the internal combustion engine has a high load.

4. The internal combustion engine according to claim 1, wherein the control device is configured to control the reformed fuel composition adjusting unit such that a proportion of methane included in the reformed fuel when the internal combustion engine has a high load becomes larger than a proportion of methane included in the reformed fuel when the internal combustion engine has a low load.

5. The internal combustion engine according to claim 1, wherein:
the control device includes a required power calculation unit configured to calculate a required power to be output from the internal combustion engine based on an engine rotation speed and a position of an accelerator lever; and
the control device is configured to calculate a target heat generation quantity of the reformed fuel based on the required power and a reformation efficiency in the fuel reforming unit and, based on the target heat generation quantity, determine a composition of a reformed fuel as a target.

6. The internal combustion engine according to claim 1, wherein the control device is configured to control a flow of exhaust gas recirculation (EGR) gas via the reformed fuel composition adjusting unit such that a temperature of an intake gas introduced into the fuel reforming unit when the internal combustion engine has a high load becomes higher than a temperature of an intake gas introduced into the fuel reforming unit when the internal combustion engine has a low load.

7. The internal combustion engine according to claim 1, wherein the control device is configured to control the reformed fuel composition adjusting unit such that an effective compression ratio of the reformation cylinder when the internal combustion engine has a high load becomes higher than an effective compression ratio of the reformation cylinder when the internal combustion engine has a low load.

8. An apparatus comprising:
an intake-air flow rate sensor and an accelerator lever opening degree sensor configured to detect an operating state of an internal combustion engine;
a fuel reformation cylinder configured to receive a first fuel and discharge a second fuel, an octane rating of the second fuel greater than an octane rating of the first fuel;
an exhaust gas recirculation (EGR) gas amount adjusting valve, a bypass amount adjusting valve, and a variable valve unit each configured to adjust a composition of the second fuel discharged from the fuel reformation cylinder; and
a control device configured to control each of the EGR gas amount adjusting valve, the bypass amount adjusting valve, and the variable valve unit such that based on a first engine load, a first air-fuel mixture with a first equivalence ratio is received by the fuel reformation cylinder, and based on a second engine load, a second air-fuel mixture with a second equivalence ratio is received by the fuel reformation cylinder, the second engine load greater than the first engine load and the second equivalence ratio greater than the first equivalence ratio.

9. The apparatus according to claim 8, wherein the control device comprises an electronic control unit.

10. The apparatus according to claim 8, wherein the control device comprises a memory and a processor.

11. The apparatus according to claim 8, wherein the first fuel comprises a liquid fuel including hydrocarbon.

12. The apparatus according to claim 8, wherein an amount of EGR gas provided to the fuel reformation cylinder is controlled by the EGR gas amount adjusting valve.

13. The apparatus according to claim 8, wherein a temperature of EGR gas provided to the fuel reformation cylinder is controlled by the bypass amount adjusting valve.

14. The apparatus according to claim 8, wherein the variable valve unit is configured to adjust an opening timing of an intake valve of the fuel reformation cylinder.

* * * * *